April 12, 1960
T. L. AVERY
2,932,504
PRESSURE EXERTING STRUT
Filed March 6, 1959
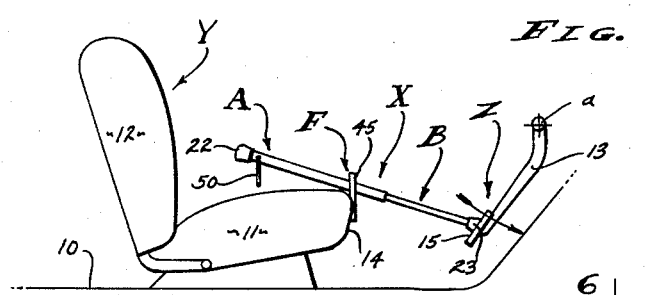
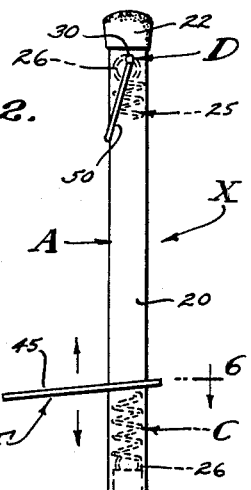
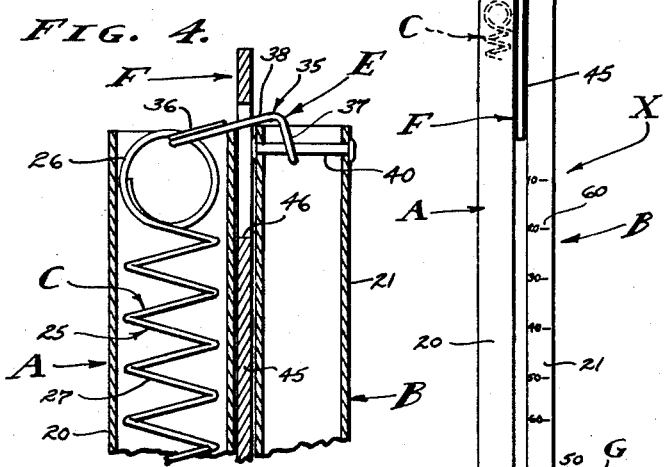
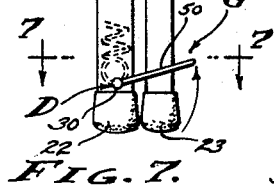
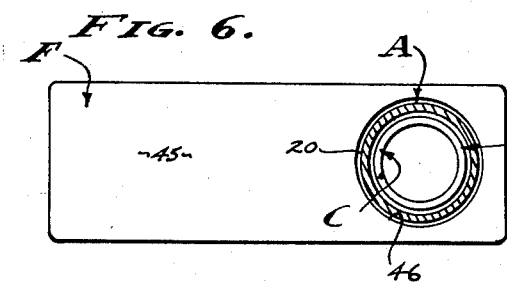
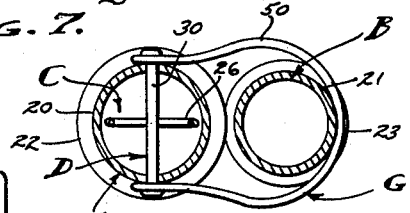
INVENTOR.
THOMAS L. AVERY
BY
AGENT

United States Patent Office 2,932,504
Patented Apr. 12, 1960

2,932,504
PRESSURE EXERTING STRUT

Thomas L. Avery, Nevada City, Calif.

Application March 6, 1959, Serial No. 797,719

7 Claims. (Cl. 267—1)

This invention relates generally to automotive vehicles and is particularly concerned with a pressure exerting strut for use in working upon said vehicles, it being a general object of this invention to provide a collapsible and extendable strut that is adjustable to yieldingly urge parts engaged thereby to push them apart in opposite directions.

In the maintenance and repair of autos and the like, and in many kinds of other activities and work, it is often necessary to press or exert pressure against a certain part. For example, it may be necessary to hold a part in position while other requirements divert the workman's attention to different parts removed from the first mentioned part. In such a case it is often necessary to employ the services of an additional workman to perform the function of holding the first mentioned part in place, or to go to the time and expense of actually installing said part. Further, a part subject to motion must be urged to move in many instances and this cannot always be performed by a single workman. It is to be understood that many instances other than those mentioned will occur and which require the application of pressure to hold a part in place and to move said part.

A particularly advantageous situation and use for the strut that I provide is in the repair or conditioning of a vehicle braking system. Therefore, I will describe my invention as applied to such application, it being understood, of course, that my invention is not to be limited by reference to this particular application.

An object of this invention is to provide a pressure exerting strut that is portable and that is to be used between spaced opposed parts to yieldingly urge said parts away from each other.

Another object of this invention is to provide a pressure exerting strut for use between spaced opposed parts and which is adjustable in effective length and pressure to be exerted.

It is an object of this invention to provide a pressure exerting strut for use between spaced opposed parts and which is collapsible for convenience of storage. A strut such as will be hereinafter described would be too lengthy for storage in a workman's tool kit and therefore it is highly advantageous to collapse it, as provided for by the present invention.

It is still another object of this invention to provide a simple and yet practical strut of the character referred to and which is inexpensive of manufacture and reliable and efficient for varied purposes.

The various objects and features of my invention will be fully understood from the following detailed description of the typical preferred form and application thereof, throughout which description reference is made to the accompanying drawings, in which:

Fig. 1 is a side view showing certain portions of a typical automotive vehicle and showing the strut of the present invention applied thereto. Fig. 2 is an enlarged view of the strut shown in Fig. 1 and shown in a condition ready for use. Fig. 3 is a view of the strut that is shown in Fig. 2 and illustrates the manner in which the strut is folded for storage. Fig. 4 is an enlarged detailed sectional view of a portion of the structure shown in Fig. 3. Fig. 5 is a detailed perspective view of one of the parts shown in Fig. 4. Fig. 6 is an enlarged sectional view taken as indicated by line 6—6 on Fig. 2, and Fig. 7 is an enlarged sectional view taken as indicated by line 7—7 on Fig. 3.

Since the strut X herein disclosed is particularly adapted to aid in the repair and/or conditioning of auto brake systems, I will describe it in that connection. In Fig. 1 of the drawings, I have shown the basic elements of an auto that are directly involved in using the strut X, that is between the seat Y and the brake pedal Z. As shown, the auto has a floor 10 that supports the seat Y, the seat comprising a cushion 11 and a back 12, and the auto has a brake arm 13 that carries the pedal Z. The cushion 11 is a flat elongate element that extends transversely of the floor 10 in a horizontal plane. The back 12 projects upwardly along the rear edge of the cushion 11, and said cushion 11 presents a substantially vertically disposed wall 14 at the front thereof.

As is present common practice, the arm 13 is a depending swinging arm that carries the pedal Z, the pedal being a flat element with a non-slip tread or face 15 spaced from the opposing wall 14 of the seat Y. The arm pivots on an axis indicated at $a$ and the pedal Z is adapted to be depressed to move forwardly as indicated by the arrow in Fig. 1. It will be apparent how the driver of the auto normally depresses the pedal Z to operate the braking mechanism (not shown).

In the instance referred to, where a brake system is involved, for example, it is often necessary to bleed the hydraulic cylinders at each individual wheel of the auto and in order to do so it is necessary to depress the pedal Z by applying continued pressure thereto.

In accordance with the present invention, I provide the pressure exerting strut X that is adapted to extend between the spaced seat wall 14 and pedal face 15 to yieldingly urge them away from each other. As best illustrated in Fig. 2 of the drawings, the strut X involves, generally, a pair of like elongate members A and B, pressure exerting means C, an anchor D for the means C, a coupling means E between the members A and B, and a lock means G to secure the strut in a collapsed condition as shown in Fig. 3. The members A and B are adapted to be guided one by the other and operate along an axis extending longitudinally. However, said members A and B are also adapted to be removed from guided engagement with each other so that the strut can be collapsed. The pressure exerting means C is preferably a spring means that is housed within one of said members A or B, the anchor D being at one end of the member and housing the spring means and the coupling means E being at or operable between the adjacent or guided ends of the members A and B.

The members A and B that are elongate and adapted to be guided by each other and to be folded relative to each other are preferably tubular in cross section and of straight configuration. As shown, the member A, which houses the pressure exerting means C, is round in cross section with a wall 20 that slidably receives the wall 21 of the member B that is also round in cross section. As clearly shown in Fig. 3, the members A and B are of substantially equal length, are open at the ends thereof, and when in a normal operating condition, as shown in Fig. 2, the outer ends of the two members are closed by bumpers 22 and 23, or the like, while the inner ends of the members are telescoped. The bumpers 22 and 23 are non-skid elements, either of which is adapted to engage the face 15 of the pedal Z.

The pressure exerting means C is shown as a spring means and is characterized by a spring 25 that is adapted to be extended as well as compressed. Therefore, both ends 26 of the spring 25 are closed as shown in Fig. 4, and the coils 27 are normally open when the spring 25 is relaxed (see Fig. 2). The spring 25 is a straight elongate helical spring with coils slightly smaller in diameter than the inner diameter of the wall 20, and substantially equal to the outside diameter of the wall 21 of member B.

The anchor D that is at one end of the member A can be positioned longitudinally of said member as circumstances require. It is preferred that the anchor be placed at the outer end of the member A to secure one end of the spring 25 to said member and to exert force when the spring is compressed (as in Fig. 1). In the case illustrated, the anchor D is the form of a pin 30 that extends transversely of the member A and through the closed end provided at the outer end of the spring 25.

The coupling means E between the members A and B secures the inner end of the spring 25 to the inner end of the member B whereby the members A and B and pressure exerting means C are operatively joined together as a unit of construction. The said two members are normally coaxially related as shown in Fig. 2, however, they are also adapted to lie adjacent to each other and slightly spaced as shown in Fig. 3. Therefore, I provide a link 35 that comprises the coupling means C and which is so shaped and proportioned as to allow the desired transposition between the two relationships of the members A and B (Figs. 2 and 3, and vice versa).

In Fig. 5 I have shown the link 35 which has opposite ends 36 and 37 for connection with the spring 25 and member B, respectively, and which has a curved body 38. Although a link of other configuration, such as straight, could be employed, I prefer a curved link to be used where folding of the members A and B is facilitated. In the particular case illustrated, the link 35 is a loop of heavy wire, overlapped to prevent disengagement, with the end 36 engaged with the spring 25 and with the end 37 engaged with the anchor pin 40 extending transversely of the member B at the upper end thereof. In practice, the pin 40 is spaced from the inner end of the member B in which case the link extends from the pin 40 to the end of the member B and then turns laterally so that it can project radially of the member B and so that the end 37 overlies the inner end of the member A when the members are positioned as shown in Fig. 3.

With the elements thus far described a telescoping strut is provided, the spring 25 being proportioned to draw the members A and B into substantial overlapped or telescoped engagement when said spring is relaxed. Since the coils 26 of the spring are substantially spaced, further telescoping of the members A and B results in compressing of the spring and to the end that the opposite outer ends of the two members are yieldingly urged apart. However, the spring 25 can be extended by manually pulling the members A and B apart, whereupon they can be folded to lie adjacent each other with the link 35 extending laterally between the inner ends of the two tubular members.

The adjustable stop F is operable when the members A and B are telescopically related and to act as an abutment for engagement with a part, such as the front wall 14 of the seat Y. The stop F is adapted to be selectively positioned along the members A and B and in accordance with the invention and for simplicity of construction the stop F is in the form of a plate 45 with an opening 46 therethrough to pass the members A and B. As best illustrated in Fig. 6, the plate 45 is elongate with the opening 46 through it at one end, said opening being somewhat larger than the cross section of the member A or B. With the opening 46 proportioned as shown and described the imperforate end, as shown in this case, projects laterally of the member A or B and when pressure is applied longitudinally as indicated by the arrows in Fig. 2, in either direction, the plate 45 grips the outer wall of the member in which it is engaged. Thus, as indiated in Fig. 1, the plate 45 of the stop F can be selectively positioned as described in order to engage a part, such as, for example, the wall 14 of the seat Y.

The plate 45 is conveniently positioned intermediate the two members A and B when the strut X is collapsed, as shown in Figs. 3 and 4, the coupling link 35 being proportioned to hold said two members in spaced relationship accommodating the plate 45 therebetween.

The lock means G is provided to secure the outer ends of the two members A and B together and to thereby maintain the strut X in a collapsed or folded condition. Although the means G can vary widely in form, the means G is preferably in the form of a bail 50, or the like, for simplicity of construction and operation. As shown, the bail 50 is pivotally carried at the end portion of one member, the member A, and is adapted to swing over the end portion of the other member B. As shown, the bail 50 is at the outer ends of the two members, and is characterized by a loop of sufficient size to readily accommodate the member B, without difficulty.

From the foregoing it will be apparent that I have provided a strut X that involves but few simple, easily formed and assembled parts. When in the collapsed condition, as shown in Fig. 3, the strut is compact and readily stored, as in the tool box or chest such as ordinarily employed by workmen. When in the extended and normal operating condition as shown in Fig. 2, the strut is substantial in length and is compressible to extend between opposed parts. In order to place the strut X in operating condition it is a simple matter to swing the bail 50 out of engagement with the member B, to the end that the two members A and B can be aligned for telescopic relationship. When said members are in said latter relationship the spring 25 pulls them together so that there is substantial engagement at the inner ends of the two members. It will be readily apparent how the stop F is selectively positioned to engage the wall 14 with the spring 25 suitably compressed and the bumper 23 yieldingly placed against the pedal Z thereby operating the brake mechanism of the auto. Further, markings 60 are provided at intervals along the member B in order to indicate force exerted by the strut. By selectively positioning the stop F, the desired force can be exerted as indicated by said markings 60.

Having described only the typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A pressure exerting strut for use in yieldingly urging opposed parts in opposite directions and including, a pair of elongate members shiftable longitudinally relative to each other, a pressure exerting means comprising a spring with one end anchored to the outer end of one of said members, coupling means comprising a link extending between the spring and an anchor secured in the other member and connecting the other end of the spring to the inner end of the other of said members, and the said two members being engageable with said opposed parts and being extensible for disengagement with each other with the said link extending therebetween and for folding one against the other.

2. A pressure exerting strut for use in yieldingly urging opposed parts in opposite directions and including, a pair of elongate members shiftable longitudinally relative to each other, a pressure exerting means comprising a spring with one end anchored to the outer end of one of said members, coupling means comprising a link extending between the spring and with an angular end secured to an anchor in the other member and connecting the other end of the spring to the inner end of the other of said members, and the said two members being engageable with said opposed parts and being extensible for disengagement with each other with the said link extending therebetween and for folding one against the other.

3. A pressure exerting strut for use in yieldingly urging opposed parts in opposite directions and including, a pair of elongate members shiftable longitudinally relative to each other and with their inner end portions adapted to be guidedly engaged with each other, a pressure exerting means comprising a spring with helical coils to be both extended and compressed, one end of said spring being anchored to the outer end of one of said members, the other end of said spring being coupled to the inner end of the other of said members, the said two members being normally engageable with said opposed parts, and said two members being extensible for disengagement from each other and for folding one against the other.

4. A pressure exerting strut for use in yieldingly urging opposed parts in opposite directions and including, a pair of elongate members shiftable longitudinally relative to each other and with their inner end portions adapted to be guidedly engaged with each other, a pressure exerting means comprising a spring with helical coils to be both extended and compressed, one end of said spring being anchored to the outer end of one of said members, the other end of said spring being coupled to the inner end of the other of said members, the said two members being normally engageable with said opposed parts, and said two members being extensible for disengagement from each other and for folding one against the other, and lock means to hold the members in folded condition.

5. A pressure exerting strut for use in yieldingly urging opposed parts in opposite directions and including, a pair of elongate members shiftable longitudinally relative to each other and with their inner end portions adapted to be guidedly engaged with each other, a pressure exerting means comprising a spring with helical coils to be both extended and compressed, one end of said spring being anchored to the outer end of one of said members, the other end of said spring being coupled to the inner end of the other of said members, the said two members being normally engageable with said opposed parts, and said two members being extensible for disengagement from each other and for folding one against the other, and lock means comprising a bail on one member and engageable with the other member to hold the said members in folded condition.

6. A pressure exerting strut for use in yieldingly urging opposed parts in opposite directions and including a pair of elongate members shiftable longitudinally relative to each other and with their inner end portions adapted to be guidedly engaged with each other, a pressure exerting means comprising a spring with helical coils to be both extended and compressed, one end of said spring being anchored to the outer end of one of said members, the other end of said spring being coupled to the inner end of the other of said members, a stop plate with an opening therethrough to selectively grip one of said members and to normally project laterally therefrom to engage one of said opposed parts, the other member being normally engageable with said opposed parts and said two members being extensible for disengagement from each other and for folding one against the other, and lock means to hold the members in folded condition with the stop plate intermediate the two members.

7. A pressure exerting strut for use in yieldingly urging opposed parts in opposite directions and including, a pair of elongate members shiftable longitudinally relative to each other and with their inner end portions adapted to be guidedly engaged with each other, a pressure exerting means comprising a spring with helical coils to be both extended and compressed, one end of said spring being anchored to the outer end of one of said members, the other end of said spring being coupled to the inner end of the other of said members, being normally engageable with said opposed parts, and said two members being extensible for disengagement from each other and for folding one against the other, and lock means comprising a bail on one member and engageable with the other member to hold the said members in folded condition with the stop plate intermediate the two members.

References Cited in the file of this patent
UNITED STATES PATENTS

| | | |
|---|---|---|
| 1,681,192 | McBride | Aug. 21, 1928 |
| 2,129,338 | Timmons | Sept. 6, 1938 |
| 2,171,832 | Hoeppner | Sept. 5, 1939 |
| 2,671,355 | Hawkins | Mar. 9, 1954 |